United States Patent Office 2,709,655
Patented May 31, 1955

2,709,655

DIAZOTYPE PHOTOPRINTING MATERIAL

Joseph E. Frederick, Johnson City, N. Y., assignor to General Aniline & Film Corporation, New York, N. Y., a corporation of Delaware No Drawing. Application June 28, 1952,
Serial No. 296,239

6 Claims. (Cl. 95—8)

This invention relates to diazotype photoprinting material containing a base material having a dried precoat of a finely divided alumina pigment and a film-forming lyophilic basic-to-amphoteric nitrogenous binder, the surface thereof being sensitized with a light-sensitive diazo compound and an azo coupling component. It also relates to processes for preparing such materials.

Diazotype photoprinting materials are known and have achieved a very appreciable commercial success. In order to enlarge this commercial success and improve the quality of the product, the art is confronted with the problem of providing such materials having superior copying efficiency; i. e., materials which give developed prints of superior image density for a given combination of diazo compound and coupling component.

It has been found in accordance with the invention, and surprisingly indeed, that if the base material or support is provided with a dried precoat of alumina pigment having a particle size of up to ten microns together with a film-forming lyophilic basic-to-amphoteric nitrogenous binder, having 1 to 3 parts of the pigment per part of the binder, and then sensitized by the usual methods, the resulting material gives developed prints of markedly superior image density.

The objects achieved in accordance with the invention as described herein include the provision of diazotype photoprinting materials which give developed prints of superior image density; and other objects which will be apparent as details or embodiments of the invention are set forth hereinafter.

In order to facilitate a clear understanding of the invention, the following preferred specific embodiments are described in detail:

Example 1

Paper base material is uniformly coated with the following composition:

6.0 parts by weight alumina pigment (largely gamma alumina, at least 99% $Al_2O_3$, having a particle size range of 0.02 to 0.04 micron and a surface area of 50–70 square meters per gram).
2.5 parts sodium caseinate
100.0 parts water.

This composition may be applied to the base material by methods commonly used in the paper coating art. A doctor blade or an air brush can be used to insure uniform distribution of the coating composition, and the uniformity of the coating slurry may be maintained by agitation thereof. After coating, the coated material is dried, by usual methods.

Then the dried precoated paper base material is sensitized with the following composition:

2.0 parts N,N-dimethylaniline-p-diazonium chloride
5.0 parts zinc chloride
3.0 parts 2,3-dihydroxynaphthalene-6-sulfonic acid
5.0 parts citric acid
4.0 parts thiourea
5.5 parts ethylene glycol
0.1 part saponin
100.0 parts water.

After drying while protecting the material from actinic light, it is exposed to actinic light under a translucent original having an opaque positive image to be reproduced; and then the image is developed by exposure to aqueous ammonia, a positive copy being obtained. The image is of a deep blue color on a clear white background. This photocopy is characterized by excellent definition, fastness to light and washing, smoothness of surface and whiteness of background, and stability toward discoloration on exposure to light and air.

The image density produced under usual developing conditions of the material obtained in accordance with this example is about 25 to 30% stronger than that of a control material prepared by similar sensitization of the paper base material, but omitting the precoat. This improvement in image density is more than twice as great as that obtainable by precoating the base material with the finely divided alumina alone or with the binder alone.

Example 2

The above example is repeated, using as the pigment, alumina of particle size in the range of 50 to 10,000 Angstrom units (largely a crystalline material, probably the alpha form). Very similar results are obtained upon printing and developing the material; however, the Example 1 material is slightly superior, possibly because of the larger surface area of the pigment.

Comparable results to the foregoing are obtained with various modifications, such as the following: The particle size of the pigment may be in the range of the smallest colloidal particle sizes up to 10 microns. Larger particles are to be avoided, since they tend to give coatings of undesirable roughness. A characteristic of colloidal particles is their so-called Tyndall effect under indirect illumination of aqueous suspensions thereof. Heavy metal impurities such as iron oxides or salts should be avoided, since they tend to cause undesirable discoloration of the materials.

The binder may be any film-forming lyophilic colloid having alkaline to amphoteric properties. Because of these properties, the binder combines with acid reacting materials such as coupling components containing phenolic or enolic hydroxyl groups, or sulfonic or carboxylic acid groups. Suitable binders are natural or artificial nitrogenous polymers, such as casein, alkali-soluble vegetable protein (e. g. soya protein), gelatine, glue, and water-soluble condensation products of lower aldehydes (especially formaldehyde) with organic bases such as dicyandiamide, guanidine, guanyl ureas, biguanides, and melamine. Other water-soluble film-forming synthetic polymers of the condensation or addition type containing basic amino groups or basic tertiary nitrogen atoms can be similarly employed. Synthetic resins containing basic nitrogen atoms or amino groups, suitable for use as binders in accordance with this invention are in the nature of anion exchange resins. These binders, when employed together with finely divided alumina in the coating applied to a base material, prior to sensitization with a diazotype sensitizing composition, apparently combine with, and anchor, the azo coupling components and the image-forming azo dyes produced therefrom in the light-sensitive layer. In this way, they render the image fast to washing and avoid color shift due to migration of different coupling components when several of these are included in the sensitizing composition to produce a composite color, e. g. a black line diazotype image.

A weight ratio of from 1 to 3 parts of alumina should be used per part of the binder. Within this range, a concentration of these materials in the aqueous slurry employed for coating the base can be varied over a rather wide range, depending upon the loose or tight quality of the base material, the viscosity of the slurry, and the requirements of the coating equipment used for applying the slurry to the base. The concentration of the slurry and the manner of application thereof to the base material are selected so as to produce upon drying, a smooth, even, continuous surface of alumina particles on the base. For paper base material of relatively loose, open texture, slurries of relatively higher concentration and viscosity are desirable; while for paper of relatively tight characteristics, slurries of lower concentration and lower viscosity are more desirable. Generally, the slurry contains from 1 to 10% by weight of the binder, and an amount of the pigment in relation to the binder within the above-mentioned range.

The dried precoated material may be sensitized by applying the light-sensitive diazo component and an azo coupling component either simultaneously or successively in either order, usually in the form of an aqueous solution. Suitable light-sensitive diazo compounds may be obtained by diazotization of the following amines:

p-Amino-diphenylamine
p-Phenylenediamine-monosulfo acid
N-β-hydroxyethyl-N-methyl-p-phenylenediamine
N-β-hydroxyethyl-N-ethyl-p-phenylenediamine
p-Ethylamino-m-toluidine
p-Diethylamino-aniline
p-Dimethylamino-aniline
N-benzyl-N-ethyl-p-phenylenediamine
p-Dimethylamino-o-toluidine
p-Diethylamino-o-phenetidine
4-benzoylamino-2,5-diethoxyaniline
2-amino-5-dimethylamino-benzoic acid
N,N-di(β-hydroxyethyl)-p-phenylenediamine
p-(N-ethyl-N-β-hydroxyethylamino)-o-toluidine
p-Di-β-hydroxyethylamino-o-chloroaniline
p-Ethylamino-aniline
p-Phenylenediamine
2,5-diethoxy-4-(4'-ethoxyphenylamino)-aniline Diazonium compounds obtained from the foregoing amines can be employed in the form of their stable diazonium sulfates, chlorobenzene sulfonates or borofluorides, or in the form of the double salts of the diazonium chloride with zinc chloride, cadmium chloride or stannic chloride.

Suitable azo coupling components for use in the above-mentioned materials are typified by:

1-(sulfophenyl)-3-methyl-pyrazolone-5
p-Sulfo-acetoacetanilide
1,8-dihydroxynaphthalene-3,6-disulfonic acid
1-benzoylamino-8-hydroxynaphthalene-3,6-disulfonic acid
Resorcinol
Resorcinol-5-sulfonic acid
Phloroglucinol
Phloroglucinol carboxylic acid
2,2',4,4'-tetrahydroxy-biphenyl
2,4,4'-trihydroxy-biphenyl-2'-sulfonic acid
2-naphthol-3,6-disulfonic acid The foregoing coupling components can be employed alone, or in various combinations of two or more to obtain desired image coloration. Despite the use of coupling components containing water-solubilizing sulfonic or carboxylic acid groups, the image colorations produced are of excellent fastness to washing by reason of the reaction of these acidic materials with the basic-to-amphoteric nitrogenous colloids employed as binders in precoating the base material according to this invention.

For most purposes, the base material employed is paper. However, other material such as cardboard, plastic film, cloth, metal or glass can also be precoated with a suspension of finely divided alumina and binder, dried, and sensitized in accordance with the invention; the resulting materials having similar advantages in increased image density, excellent definition, fastness to washing, absence of background discoloration, and smooth white appearance.

Advantageously, the sensitizing compositions further include stabilizing agents such as citric, tartaric, tricarballylic or boric acids and salts such as zinc chloride, cadmium chloride or nickel sulfate to prevent premature coupling of the image-forming diazo and azo coupling components; anti-oxidants such as thiourea or thiosinamine, to improve the stability of the resulting material to background discoloration; penetration assistants such as a lower alcohol, e. g. methanol, ethanol or isopropanol; and humectants (i. e., water-absorbent components) such as glycol, glycerine, propylene glycol or dextrin.

These materials are adapted to yield an azo dye coloration on suitable development, especially by alkaline treatment, particularly by exposure to gaseous ammonia; and copies of surprisingly superior image density are obtained, as compared to analogous materials containing a precoat of silica and sodium caseinate.

In view of the foregoing disclosures, variations and modifications of the invention will be apparent to one skilled in the art, and it is intended to include within the invention all such variations and modifications except as do not come within the scope of the appended claims.

I claim:

1. A diazotype photoprinting material comprising a base material having a dried precoat of from 1 to 3 parts of alumina pigment having a particle size range of up to 10 microns and 1 part of a film-forming lyophilic basic-to-amphoteric nitrogenous binder, the surface thereof being sensitized with a light-sensitive diazo compound and an azo coupling component.

2. The material of claim 1 wherein the binder is a water-soluble film-forming synthetic nitrogenous anion exchange resin.

3. The material of claim 1 wherein the binder is a water-soluble film-forming protein compound.

4. The material of claim 3 wherein the binder is sodium caseinate.

5. The material of claim 1 wherein the pigment is largely gamma alumina having a particle size range of 0.02 to 0.04 micron and a surface area of 50 to 70 square meters per gram.

6. The material of claim 1 wherein the pigment is largely crystalline alumina of major diameter particle size in the range of 50 to 10,000 Angstrom units.

References Cited in the file of this patent

UNITED STATES PATENTS 2,566,709    Von Glahn et al. _____ Sept. 4, 1951

FOREIGN PATENTS 318,511    Great Britain _____ Aug. 7, 1930